United States Patent [19]

Jolma et al.

[11] Patent Number: 6,092,222

[45] Date of Patent: Jul. 18, 2000

[54] DATA TRANSMISSION METHOD, DATA TRANSMISSION SYSTEM, AND CELLULAR RADIO SYSTEM

[75] Inventors: Petri Jolma; Ling Wang, both of Espoo, Finland

[73] Assignee: Nokia Telecommunications Oy, Espoo, Finland

[21] Appl. No.: 08/693,134

[22] PCT Filed: Dec. 14, 1995

[86] PCT No.: PCT/FI95/00681

§ 371 Date: Aug. 13, 1996

§ 102(e) Date: Aug. 13, 1996

[87] PCT Pub. No.: WO96/19880

PCT Pub. Date: Jun. 27, 1996

[30] Foreign Application Priority Data

Dec. 19, 1994 [FI] Finland ................................. 945962

[51] Int. Cl.[7] .................................................. G06F 11/00
[52] U.S. Cl. ............................ 714/76; 714/749; 714/752
[58] Field of Search ............................ 370/100.1, 60.1, 370/85.2, 208, 350, 314, 311, 332, 333, 347; 340/825.44; 375/281, 260, 308; 704/200, 201, 278, 500, 504; 714/749, 752, 786

[56] References Cited

U.S. PATENT DOCUMENTS

| | | | |
|---|---|---|---|
| 4,472,802 | 9/1984 | Pin et al. | 370/104 |
| 4,972,483 | 11/1990 | Carey | 704/222 |
| 5,091,945 | 2/1992 | Kleijn | 704/219 |
| 5,182,753 | 1/1993 | Dahlin et al. | 714/749 |
| 5,208,812 | 5/1993 | Dudek et al. | 370/100.1 |
| 5,260,700 | 11/1993 | Merchant et al. | 340/825.44 |
| 5,299,198 | 3/1994 | Kay et al. | 370/347 |
| 5,303,234 | 4/1994 | Kou | 370/85.2 |
| 5,327,576 | 7/1994 | Uddenfeldt et al. | 370/333 |
| 5,357,513 | 10/1994 | Kay et al. | 370/332 |
| 5,404,355 | 4/1995 | Raith | 370/311 |
| 5,422,932 | 6/1995 | Kay et al. | 455/452 |
| 5,502,721 | 3/1996 | Pohjakallio | 370/60.1 |
| 5,666,370 | 9/1997 | Ganesan et al. | 714/752 |

FOREIGN PATENT DOCUMENTS

| | | |
|---|---|---|
| 0 332 825 A2 | 9/1989 | European Pat. Off. ......... H04Q 7/04 |
| 0 333 679 A1 | 9/1989 | European Pat. Off. .......... H04B 7/26 |
| 472 511 | 2/1992 | European Pat. Off. . |
| 584 865 | 3/1994 | European Pat. Off. . |
| 94/07313 | 3/1994 | WIPO . |

OTHER PUBLICATIONS

Bersford–Smith, "Systolic Divices For Speech Processing", IEEE, pp. 2–88 – 2–90, 00/1989.

Falciasecca, "Investigation on A Dynamic Channel Allocation For High Capcity Mobile Radio Systems", IEEE, pp. 176–181, 00/1988.

Heralall. "High Capacity Cellular Patterns For Land Mobile Radio Sysstems Using Directional Antennal", IEEE, pp. 75–80, Feb. 1989.

Whiting, "Performance Bounds For Cell Management Schemes In Cellular Radio" IEEE, pp. 17/1–17/10, 00/1989.

(List continued on next page.)

*Primary Examiner*—William Grant
*Assistant Examiner*—McDieunel Marc
*Attorney, Agent, or Firm*—Pillsbury Madison & Sutro LLP

[57] ABSTRACT

A data transmission method in a system employing information channels having at least two different capacities, on which channels speech is transmitted by at least two different coding techniques in such a manner that on a channel having a higher capacity, fewer symbols to be transmitted are coded from the same speech signal block than on a channel having a lower capacity, includes speech coding, channel coding, dividing the speech signal block, combining parts, adding error correction symbols, adding rail symbols, and convolution coding. It is also possible that the convolution-coded symbols are transmitted as interleaved or that the channel-coded signal is transmitted over the full rate channel. As a result of this method, the cell size of a radio telephone system and thus, the coverage area of the system, is extended without large changes in equipment or without an increase in transmission power.

3 Claims, 3 Drawing Sheets

OTHER PUBLICATIONS

Beck, "Strategies For Handover And Dynamic Channel Allocation In Micro–Cellular Mobile Radio Systems", IEEE, pp. 178–185, 00/1989.

Akeberg, "Properties Of A TDMA Pco Cellular Office Communication System", IEEE, pp. 186–194, 00/1989.

Nettleton, "A high Capacity Assignment Method For Cellular Mobile Tlephone Systems" IEEE, pp. 395–637, 00/1989.

Barkry, "computer Investigations Of Telephone–Trafic For Cellular Mobile Radio Systems", IEEE, pp., 00/1989.

Dunlop, "Speech Trafic Capacity Of Idle–Signal Casting Multiple Access With Colosion Detection (ICMA/CD) For Cellular Mobile Radio", IEEE, pp. 1–5, 00/1989.

Mouly and Pautet, The GSM System for Mobile Communications, published in 1992, pp. 79–122 ISBN 2–9507190–0–7.

IEEE International conference on Acoustics, Speech and . . . , vol. 1, 1994, (New York), Jorg–Martin Muller et al, "A Codec Candidate for the GSM Half Rate Speech Channel", p. 257 – p. 260, see especially ch 2.2.

DATA TRANSMISSION METHOD, DATA TRANSMISSION SYSTEM, AND CELLULAR RADIO SYSTEM

This application claims benefit of international application PCT/FI95/00681, filed Dec. 14, 1995.

FIELD OF THE INVENTION

The present invention relates to data transmission in a system employing information channels having at least two different capacities, on which channels speech is transmitted by at least two different coding techniques in such a manner that on a channel having a higher capacity, essentially fewer symbols to be transmitted are coded from the same speech signal block than on a channel having a lower capacity.

BACKGROUND OF THE INVENTION

In designing data transmission systems, especially cellular radio systems, two essential aspects have to be especially taken into account. Firstly, the required geographical area is to be covered at low costs. Secondly, information is to be transmitted with the smallest possible number of transmission errors.

It is typical of digital data transmission systems in which speech information is transmitted that they apply speech coding, to change analog speech into a digital form. For instance in a fixed telephone network, analog speech is changed into a digital signal the bit rate of which is 64 kbit/s. In many data transmission systems, for instance in cellular radio systems, this transmission rate is impractical since it requires too much transmission capacity. The speech coding used in these systems is thus implemented, if possible, using a transmission channel and a bit rate as small as possible.

Speech coding techniques are constantly studied, and thus, for instance in designing cellular radio systems, the development of technology has been taken into account by making an allocation in the system for the use of better speech coding algorithms. This is the case for instance in the GSM (Groupe Spécial Mobile) system, in which is specified a so-called half rate codec, the bit rate of which is half of the bit rate of a so-called full rate codec. With the use of a half rate codec, the capacity of the system can thus be increased, since the amount of bits to be transmitted is half of what it used to be. For instance, in TDMA (Time Division Multiple Access) systems, it is thus possible to transmit a double amount of coded speech in the same amount of time.

In constructing a radio telephone system, attempts are thus made to produce a desired coverage area at lowest possible cost. In considering the location of the base stations of the system, both the required traffic capacity and the produced cell size are taken into account. In areas where the expected amount of traffic is great, cell sizes are small, whereas in sparsely populated areas where the required traffic capacity is small, attempts are made to produce as large cells as possible. Transmission capacities used at base stations and terminal equipment thus increase. In some cases, where it is uneconomic to construct a dedicated base station, it is possible to use a separate repeater, which receives signals arriving from a base station and repeats them within its own area. Costs can thus be reduced to some extent, however not significantly.

SUMMARY OF THE INVENTION

Accordingly, an object of the present invention is to extend the cell size of a radio telephone system and thus the coverage area of the system without great changes in the equipment and particularly without an increase in transmission power. A further object of the invention is to implement advantageously a cellular system cell which has an essentially larger coverage area than before, without the used transmission capacities increasing essentially.

This is achieved with method, characterized in that a signal transmitted on at least one channel having a lower capacity is speech coded according to a channel of a higher capacity, and that channel coding is performed on the data speech coded in this manner in such a manner that the obtained number of symbols corresponds to the channel of a lower capacity.

The invention further relates to a data transmission system employing information channels having at least two different capacities, the speech transmitted on said channels being coded by at least two different coding techniques in such a manner that on a channel having a higher capacity, essentially fewer symbols to be transmitted are coded from the same speech signal block than on a channel having a lower capacity. The data transmission system of the invention is characterized in that a signal transmitted on at least one of the system's information channels having a lower capacity is speech coded according to a channel of a higher capacity, and that channel coding is performed on the data speech coded in this manner in such a manner that the obtained number of symbols corresponds to the channel of a lower capacity.

The invention further relates to a cellular radio system employing information channels having at least two different capacities, the speech transmitted on said channels being coded by at least two different coding techniques in such a manner that on a channel having a higher capacity, essentially fewer symbols to be transmitted are coded from the same speech signal block than on a channel having a lower capacity, said system having at least one carrier frequency at which frequency hopping is used. The cellular radio system of the invention is characterized in that in at least some cells of the system, the coverage area of the base station comprises an inner coverage zone, which employs an information channel of either a lower or higher capacity on which frequency hopping is not applied, and an outer coverage zone, which employs an information channel having a lower capacity, the signal transmitted on said channel being speech coded according to a channel of a higher capacity, and that channel coding is performed on the data speech coded in this manner in such a manner that the obtained number of symbols corresponds to the channel of a lower capacity, and frequency hopping being applied on said channel.

The method of the invention thus utilizes half rate speech coders developed for different systems, which speech coders thus use half of the channel resources of full coding. In the method of the invention, speech is coded with half rate coding algorithms but is channel coded to be transmitted on a full coding rate channel. The channel coding can thus be implemented so well that the system operates at a signal level lower by almost 6 dB than in a situation where speech is transmitted on a half coding rate channel. This enables an increase of about 50% in the radius of the coverage area of a cell. The solution of the invention thus enables sparsely populated areas to be covered with fewer base stations than before.

The method of the invention can naturally also be applied in connection with speech coders operating at low rate other than half rate coders. In the following, the invention will be described, however, by using half rate coding as an example, without restricting the invention to it, however.

The method of the invention can be applied particularly advantageously in connection with frequency hopping. The method of the invention can be applied in a cellular radio system to increase the coverage area by establishing two coverage areas in a cell, the inner one of which corresponds to a coverage area implemented by conventional means and the outer one to a coverage area enabled by the method of the invention, in which area frequency hopping and half rate coding on a full rate channel are used.

BRIEF DESCRIPTION OF THE DRAWINGS

In the following, the invention will be described in more detail with reference to the examples according to the accompanying drawings, in which.

DETAILED DESCRIPTION OF THE PRESENTLY PREFERRED EXEMPLARY EMBODIMENTS

The method of the invention can be applied in any digital data transmission system in which several different speech coding rates can be used and in which different transmission channels are provided for these coding rates. One such data transmission system is the GSM cellular radio system, which will be used as an example in the following while describing the preferred embodiment of the invention, without, however, restricting the invention to it.

Figure 1:
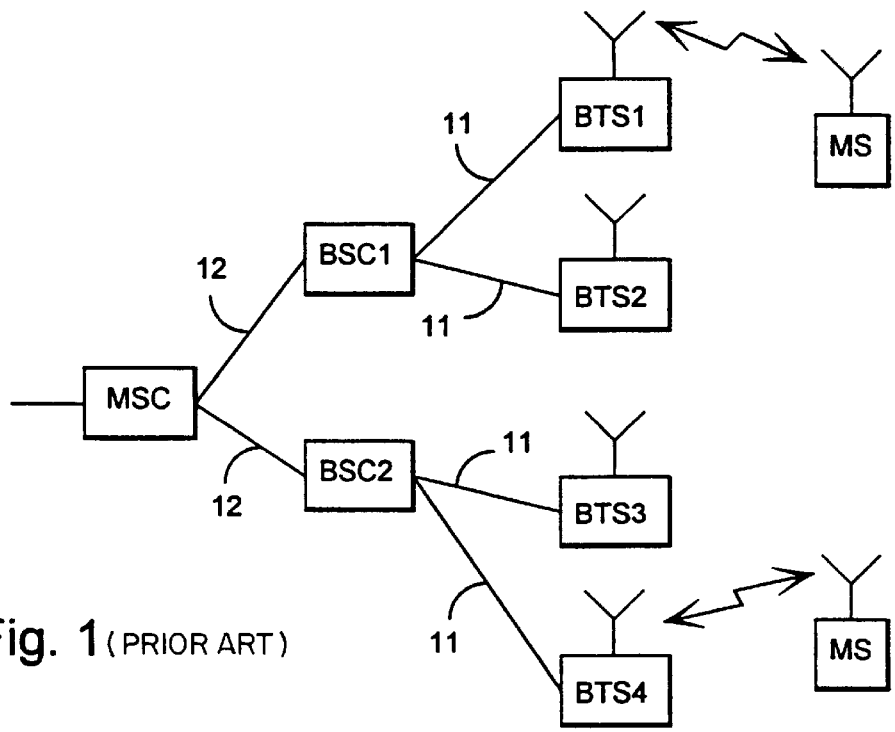
FIG. 1 illustrates schematically a part of a cellular radio system in which the method of the invention can be applied.

FIG. 1 illustrates schematically a part of the GSM cellular radio system. In the cellular radio system, the area covered by the system is divided into radio cells. Two base station controllers BSC1 and BSC2 are connected with digital transmission links 12 to a mobile exchange MSC. Further, base stations BTS1, BTS2 and BTS3 and BTS4 are connected with digital transmission links 1 to the base station controllers BSC1 and BSC2, respectively. Each BSC and the base stations connected to it constitute a base station system BSS. Typically, the radio coverage area of one base station BTS constitutes one radio cell. Each base station BTS1–BTS4 has a predetermined, fixed number of physical radio channels. The GSM system is described in more detail for instance in M. Mouly, M -P. Pautet: The GSM System for Mobile Communications, 1992, ISBN 2-9507190-0-7, which is incorporated herein by reference.

A physical channel of the GSM system consists of TDMA frames, each of which contains a certain number of time slots, by which logic channels are transferred. In using a conventional, so-called full rate codec, each physical channel has preferably eight time slots. The logic channels include traffic channels for calls established with subscriber terminal equipment MS located in a cell.

In the following, it is first described how channel coding is implemented in the present GSM system in the case of a full rate codec. In the GSM system, a full rate codec produces data blocks the length of which is 260 bits. Data blocks are generated at intervals of 20 ms. Channel coding is performed on such a data block, which results in a coded data block, which contains 456 bits, which are interleaved into eight time slots. Errors occurring over the transmission link are present in the received speech signal in different ways depending on where the defective bit is located in the data block. All bits of the data block are not equivalent, but some bits are more significant than others due to coding techniques. Because of this, conventional channel coding is performed by dividing a data block into three parts according to the importance of the information contents of the bits contained by these parts, and each part is treated in a different manner.

Figure 2:
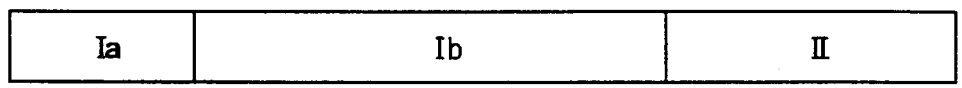
FIG. 2 illustrates a known method for performing channel coding in the case of a full rate codec.

FIG. 2 illustrates the composition of a data block produced by a full rate codec and the division thereof into different parts. The data block comprises three parts, Ia, Ib and II, which comprise 50, 132 and 78 bits, respectively. The bits of part Ia are coded by adding three error detection bits to the bits, whereafter the part is convolution coded with efficiency ratio 1/2. The efficiency ratio of convolution coding refers to the ratio of actual data bits and all bits to be transmitted. The convolution coding increases the number of bits to be transmitted due to redundant bits produced as a result of the coding. The bits of part Ib are convolution coded directly with efficiency ratio 1/2. Part II is not coded in any manner. The length of the coded data block obtained in this manner is thus 456 bits, which are thus interleaved into different time slots by dividing the data block to be transmitted in eight time slots, in order to minimize the effect of errors taking place over the transmission link.

The following is a description of a known manner of performing channel coding in the present GSM system in the case of a half rate codec. In the GSM system, a half rate codec produces data blocks the length of which is 112 bits. A data block is divided into two parts, the first part being convolution coded with efficiency ratio 1/2 and the second one not being coded. This results in a 228-bit data block, which is interleaved into four half rate time slots.

Figure 3A:
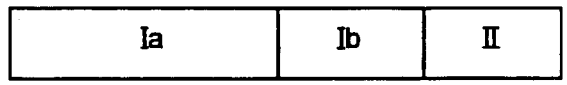
FIGS. 3a–3e show the method of the invention for performing channel coding and interleaving in the case of a half rate codec.
Figure 3B:
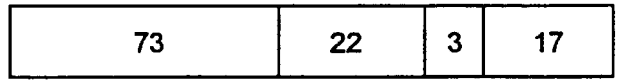

The following is a description of how channel coding is performed in the method of the invention when a half rate codec is used. FIG. 3a illustrates the composition of a data block produced by a half rate codec and the division thereof into different parts. As in the case of a full rate codec, a data block comprises three parts, Ia, Ib and II, which, in the method of the invention, comprise 73, 22 and 17 bits, respectively. The 22 bits of part Ib are coded by adding three error correction bits to the bits. The error correction polynome used has the form $G_{CRC}(D)=D^3+D^2+1$. The obtained data block is in accordance with FIG. 3b at this stage.

Figure 3C:
Figure 3D:
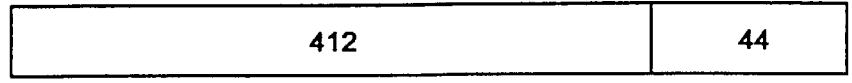

For convolution coding, two five-bit groups are added to the data block to the end of parts Ib and II according to FIG. 3c. Thereafter, parts Ia and Ib, which now thus comprise 73+22+5=103 bits, are CC(4,1,5) convolution coded together with efficiency ratio 1/4. Part II, which now comprises 17+5=22 bits, is CC(2,1,5) convolution coded with efficiency ratio 1/2. Thus is produced a data block which is in accordance with FIG. 3d. The number of bits of parts I is thus 412 and that of part II is 44. The total number of bits of the data block is thus 456, which corresponds to the length of a data block used on a full rate channel.

Figure 3E:
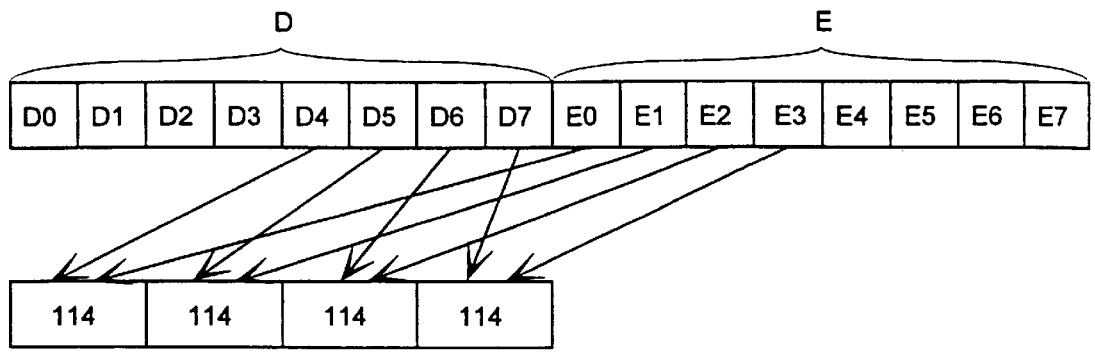

In the method of the invention, the signal coded with a half rate codec is transmitted on a full rate channel as interleaved into eight time slots. The interleaving is illustrated in FIG. 3e. The figure shows two successive data blocks D and E. Each 456-bit data block is divided into eight parts D0–D7 and E0–E7, respectively, each of which comprises 57 bits. In the interleaving, bits from two different data blocks are disposed in each time slot according to FIG. 3e. 114 data bits are thus transmitted in each time slot. Interleaving is described in more detail for instance in the reference Mouly, Pautet mentioned above.

Since the number of the original data bits was 112, and there are 456 bits to be transmitted and not 228 as in the known method, channel coding can be implemented much more efficiently than before. As a result of the method, a signal can be received with a worse signal-to-noise ratio without sacrificing the quality of the signal, since the errors over the transmission link can be detected and prevented better than before due to more efficient channel coding.

Figure 4:
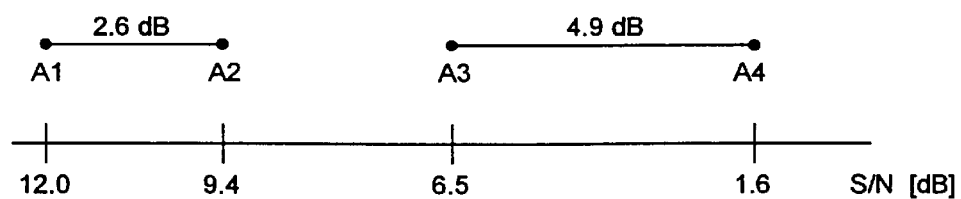
FIG. 4 illustrates signal-to-noise ratios in different coding solutions.

FIG. 4 illustrates achieved signal-to-noise ratios in different coding and channel solutions. The horizontal axis indicates the signal-to-noise ratio of a received signal in decibel units. The figure shows four different signal-to-noise ratio values in different coding and channel alternatives in such a manner that the value concerned refers to the signal-to-noise ratio which is required in the corresponding alternative in order that the quality of the received signal would be satisfactory. The quality of the received signal can be evaluated for instance with the FER (F_Error Rate) criterion. The lower the signal-to-noise ratio by which the system achieves sufficient signal quality, the larger the coverage area achieved will be.

Point A1, which thus corresponds to signal-to-noise ratio 12.0 dB, is achieved by using a solution according to prior art by transmitting a signal coded with a half rate codec on a half rate channel without frequency hopping. A corresponding solution, implemented with the method of the invention, of transmitting a signal coded with a half rate codec on a full rate channel without frequency hopping produces a signal-to-noise ratio according to point A2, i.e. 9.4 dB. The gain achieved with the solution of the invention is thus 2.6 dB.

Point A3, which thus corresponds to signal-to-noise ratio 6.5 dB, is achieved by using a solution according to prior art by transmitting a signal coded with a half rate codec on a -half rate channel while using frequency hopping. A corresponding solution, implemented with the method of the invention, of transmitting a signal coded with a half rate codec on a full rate channel while using frequency hopping produces a signal-to-noise ratio according to point A4, i.e. 1.6 dB. The gain achieved with the solution of the invention is thus 4.9 dB.

In both of the examples given above, one thus employing frequency hopping and the other being implemented without frequency hopping, a distinct improvement in the required signal-to-noise ratio is achieved with the method of the invention. This results in the fact that in a cellular radio system applying the method of the invention, a significantly larger coverage area is achieved when the same transmission power is used.

Figure 5A:
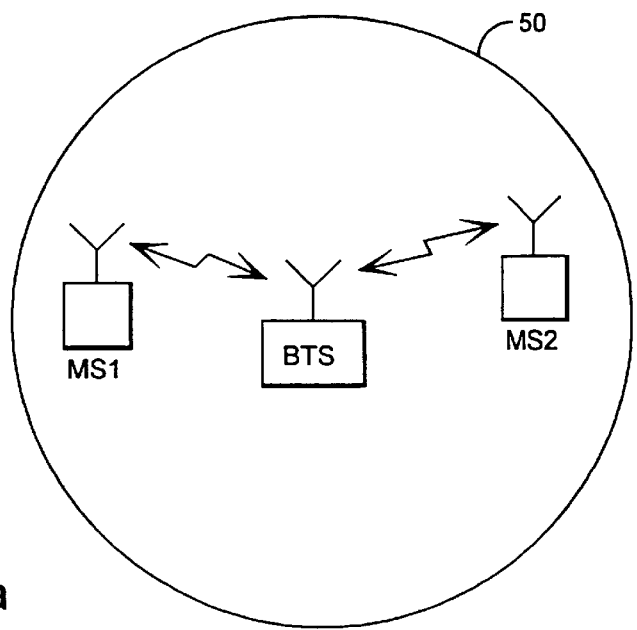
FIG. 5a illustrates schematically the coverage area of a cell of a cellular radio system.
Figure 5B:
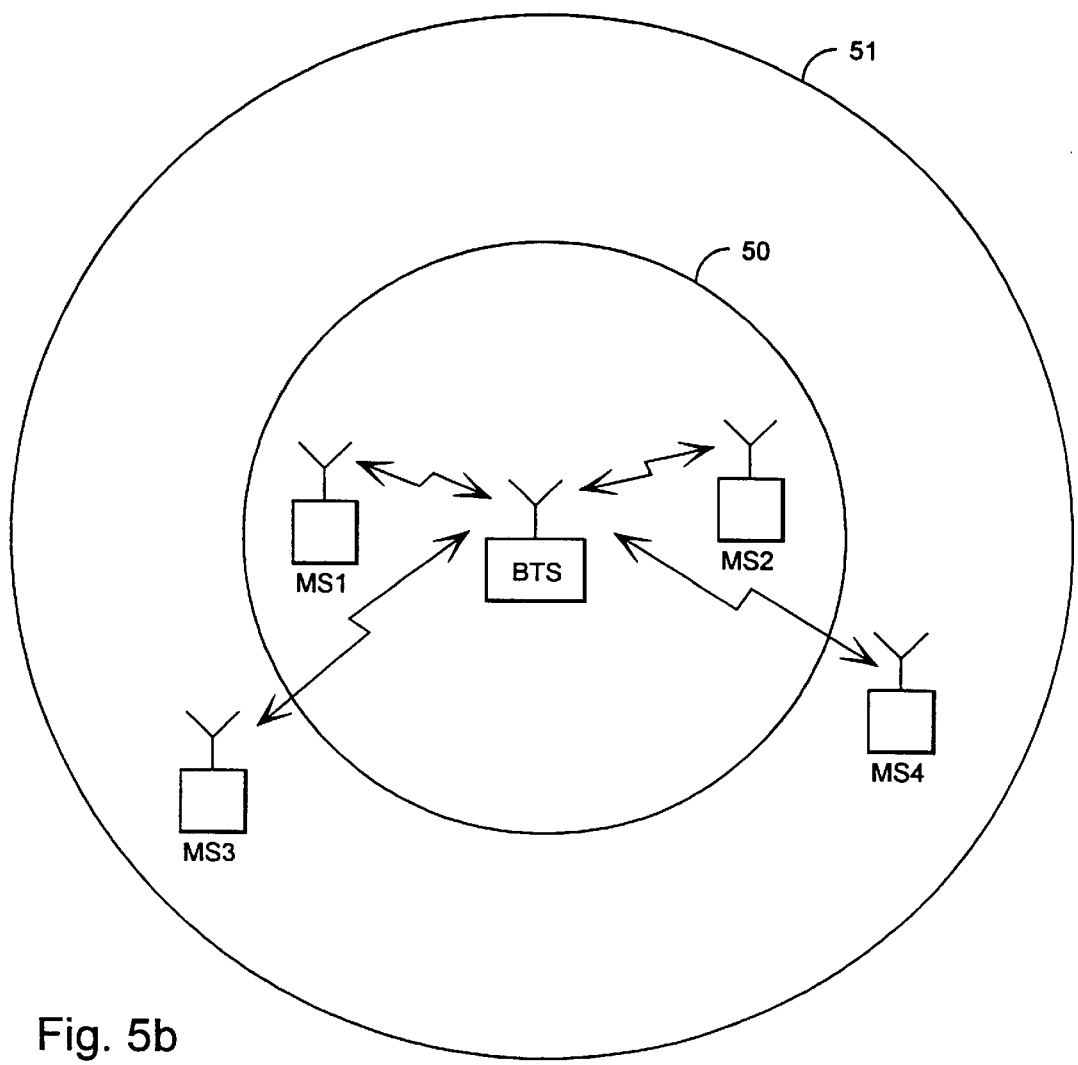
FIG. 5b illustrates schematically the coverage areas of a cell of the cellular radio system according to the preferred embodiment of the invention.

FIG. 5a illustrates schematically the conventional coverage area 50 of a cell of a cellular radio system. The cell typically comprises one base station BTS, which communicates with the subscriber terminal equipments MS1–MS2 located within its area. FIG. 5b illustrates schematically the coverage areas of a cell of the cellular radio system according to the preferred embodiment of the invention. In the preferred embodiment of the invention, the coverage area of a cell consists of two coverage areas, the inner one 50 corresponding to the coverage area of a conventional cell and the outer one 51 corresponding to an extended coverage area achieved with the method of the invention.

As stated earlier, the solution of the invention is particularly useful when frequency hopping is utilized in the system. In the GSM system, implementing frequency hopping means in practice that a base station is provided with two or more transceiver units, one of which does not use frequency hopping but the other units may apply frequency hopping. This is due to the fact that in the GSM system, each base station must transmit a—so-called broadcast control channel BCCH at a fixed frequency. The following is an exemplifying description of the preferred application of the method of the invention in a cellular radio system cell, which employs two transceiver units, one transmitting at a fixed frequency and the other utilizing frequency hopping.

The coverage area of the cell is divided into two areas according to FIG. 5b. The terminal equipments MS1 and MS2 located near the base station communicate with the base station by using a fixed frequency. Either a conventional full rate codec or a half rate codec on a half rate channel can be used at the frequency. Terminal equipment MS3–MS4, which are located outside the conventional coverage area 50, communicate with the base station by using the solution of the invention by transmitting a signal coded with a half rate speech codec on a full rate channel while utilizing frequency hopping. An increase of about 50% in the coverage area is thus achieved in the cell as compared with a conventional arrangement. When a terminal equipment moves from a coverage area into another, it must thus perform an intra-cell handover.

Although the invention has been described above with reference to the examples according to the accompanying drawings, it will be apparent that the invention is not so restricted but it can be modified in various ways within the scope of the inventive concept set forth in the appended claims.

We claim:

1. A data transmission method in a system employing information channels having at least two different capacities, on which channels speech is transmitted by at least two different coding techniques in such a manner that on a channel having a higher capacity, fewer symbols to be transmitted are coded from the same speech signal block than on a channel having a lower capacity, the method comprising:

speech coding a signal transmitted on at least one channel having a lower capacity according to a channel of a higher capacity;

performing channel coding on the speech coded data in such a manner that the obtained number of symbols corresponds to the channel of the lower capacity;

dividing the speech signal block into three parts which comprise 73, 22 and 17 symbols, respectively;

adding three error correction symbols to the 22-symbol part;

combining the first two parts and adding five know tail symbols thereto;

convolution coding the 103 symbols obtained in this manner with and an efficiency ratio of 1/4;

adding five known tail symbols to the posterior 17-symbol part; and convolution coding the 22 symbols obtained in this manner with an efficiency ratio of 1/2, wherein the speech coded data is a data block of 112 symbols.

2. A data transmission method in a system employing information channels having at least two different capacities, on which channels speech is transmitted by at least two different coding techniques in such a manner that on a channel having a higher capacity, fewer symbols to be transmitted are coded from the same speech signal block than on a channel having a lower capacity, the method comprising:

speech coding a signal transmitted on at least one channel having a lower capacity according to a channel of a higher capacity;

performing channel coding on the speech coded data in such a manner that the obtained number of symbols corresponds to the channel of the lower capacity;

dividing the speech signal block into three parts which comprise 73, 22 and 17 symbols, respectively;

adding three error correction symbols to the 22-symbol part; combining the first two parts and adding five know tail symbols thereto;

convolution coding the 103 symbols obtained in this manner with and an efficiency ratio of 1/4;

adding five known tail symbols to the posterior 17-symbol part;

convolution coding the 22 symbols obtained in this manner with an efficiency ratio of 1/2; and transmitting the convolution coded symbols as interleaved during eight time slots, wherein the speech coded data is a data block of 112 symbols.

3. A method for transmitting a speech signal in a system having capacity to transmit the speech signal via information channels of one of a full rate channel and a half rate channel using coders designed for the full rate channel and the half rate channel, respectively, the method comprising:

speech coding the speech signal using the coders designed for the half rate channel;

channel coding the speech coded signal for transmission over the full rate channel;

transmitting the channel coded signal over the full rate channel;

dividing the speech signal block into three parts which comprise 73, 22, and 17 symbols, respectively, adding three error correction symbols to the 22-symbol part, combining the first two parts and adding five known tail symbols thereto, convolution coding the 103 symbols obtained in this manner with an efficiency ratio of 1/4, adding five known tail symbols to the posterior 17-symbol part, and convolution coding the 22 symbols obtained in this manner with an efficiency ratio of 1/2, wherein the speech coded data is a data block of 112 symbols.

* * * * *